(12) United States Patent
Kubono et al.

(10) Patent No.: US 8,180,305 B2
(45) Date of Patent: May 15, 2012

(54) COMMUNICATION APPARATUS, COMMUNICATION SYSTEM, AND COMMUNICATION METHOD

(75) Inventors: Fumio Kubono, Tokyo (JP); Yoshihito Ishibashi, Tokyo (JP); Shoji Nagai, Tokyo (JP); Yuko Yoshida, Tokyo (JP); Naoki Ide, Tokyo (JP)

(73) Assignee: Sony Corporation, Tokyo (JP)

( * ) Notice: Subject to any disclaimer, the term of this patent is extended or adjusted under 35 U.S.C. 154(b) by 409 days.

(21) Appl. No.: 12/480,012

(22) Filed: Jun. 8, 2009

(65) Prior Publication Data

US 2009/0305641 A1    Dec. 10, 2009

(30) Foreign Application Priority Data

Jun. 9, 2008   (JP) .................................. 2008-150910

(51) Int. Cl.
*H01Q 11/12*   (2006.01)
(52) U.S. Cl. ........................................ 455/117; 324/686

(58) Field of Classification Search ................. 455/41.1, 455/117; 324/658, 686
See application file for complete search history.

(56) References Cited

FOREIGN PATENT DOCUMENTS

| JP | 2001-223649 | 8/2001 |
|---|---|---|
| JP | 2006-324775 | 11/2006 |
| JP | 2007-36500 | 2/2007 |

*Primary Examiner* — Tu X Nguyen
(74) *Attorney, Agent, or Firm* — Finnegan, Henderson, Farabow, Garrett & Dunner, L.L.P.

(57) ABSTRACT

There is provided a communication apparatus including a reference electrode; a signal electrode which electrostatically couples to a communication medium; a measurement unit for measuring an impedance of a circuit system including between the reference electrode and the signal electrode; and a transmission processing unit for creating a potential difference between the signal electrode and the reference electrode based on a transmission power corresponding to the impedance of the circuit system measured by the measurement unit, and transmitting a signal to another communication apparatus electrostatically coupled to the communication medium.

12 Claims, 9 Drawing Sheets

COMMUNICATION APPARATUS, COMMUNICATION SYSTEM, AND COMMUNICATION METHOD

BACKGROUND OF THE INVENTION

1. Field of the Invention

The present invention relates to a communication apparatus, a communication system, and a communication method.

2. Description of the Related Art

Researches related to electrostatic field communication having human body, space, and the like as a communication medium are being widely carried out in recent years. For instance, the electrostatic field communication is carried out between two communication apparatuses including a reference electrode and a signal electrode. More specifically, the signal electrodes of both communication apparatuses and the human body electrostatically couple, and the reference electrodes of both communication apparatuses and the space electrostatically couple to form a closed circuit. The communication apparatus on a transmission side transmits a signal by creating a potential difference between the signal electrode and the reference electrode, and the communication apparatus on the reception side receives the signal by detecting the potential difference between the signal electrode and the reference electrode. Such electrostatic field communication is described, for example, in Japanese Patent Application Laid-Open No. 2006-324775 below.

SUMMARY OF THE INVENTION

However, if a human uses the communication apparatus by holding it with his/her hand, the electrostatic coupling of not only the signal electrode but also the reference electrode and the human body (hand) may become strong depending on the way the communication apparatus is being held. As a result, the potential difference created between the signal electrode and the reference electrode lowers, and the communication characteristics lower.

The present invention addresses the above-identified, and other issues associated with methods in related art and apparatuses, and it is desirable to provide a new and improved communication apparatus capable of stabilizing the communication characteristics irrespective of the positional relationship of the communication medium and the communication apparatus, a communication system, and a communication method.

According to an embodiment of the present invention, there is provided a communication apparatus including, a reference electrode, a signal electrode which electrostatically couples to a communication medium; a measurement unit for measuring an impedance of a circuit system including between the reference electrode and the signal electrode, and a transmission processing unit for creating a potential difference between the signal electrode and the reference electrode based on a transmission power corresponding to the impedance of the circuit system measured by the measurement unit, and transmitting a signal to another communication apparatus electrostatically coupled to the communication medium.

The measurement unit may include a generation source of an AC signal to be output to the circuit system for measurement of the impedance, and the transmission processing unit may transmit the signal using the AC signal output by the generation source as a carrier wave.

The measurement unit may measure the impedance of the circuit system simultaneously with the transmission of the signal by the transmission processing unit using the AC signal.

The transmission processing unit may transmit the signal based on a high transmission power, the higher the impedance of the circuit system.

According to another embodiment of the present invention, there is provided a communication apparatus including, a reference electrode; a signal electrode which electrostatically couples to a communication medium; a measurement unit for measuring an impedance of a circuit system including between the reference electrode and the signal electrode, and a reception processing unit for receiving a signal transmitted from another communication apparatus electrostatically coupled to the communication medium by detecting a potential difference between the signal electrode and the reference electrode at a reception sensitivity corresponding to the impedance of the circuit system measured by the measurement unit.

The measurement unit may include a generation source of an AC signal to be output to the circuit system for measurement of the impedance, and the reception processing unit may demodulate the signal transmitted from another communication apparatus using the AC signal output by the generation source.

The reception processing unit may receive the signal at a high reception sensitivity, the higher the impedance of the circuit system.

According to another embodiment of the present invention, there is provided a communication system including, a first communication apparatus including, a first reference electrode, a first signal electrode which electrostatically couples to a communication medium, a measurement unit for measuring an impedance of a circuit system including between the first reference electrode and the first signal electrode, and a transmission processing unit for creating a potential difference between the first signal electrode and the first reference electrode based on a transmission power corresponding to the impedance of the circuit system measured by the measurement unlit and transmitting a signal to another communication apparatus electrostatically coupled to the communication medium, and a second communication apparatus including, a second reference electrode, a second signal electrode which electrostatically couples to a communication medium, and a reception processing unit for receiving a signal transmitted from the first communication apparatus by detecting a potential difference between the second signal electrode and the second reference electrode.

According to another embodiment of the present invention, there is provided a communication method including the steps of, measuring an impedance of a circuit system including between a first reference electrode and a first signal electrode electrostatically coupled to a communication medium of a first communication apparatus, controlling a transmission power of a signal according to the measured impedance of the circuit system, transmitting the signal by creating a potential difference between the first signal electrode and the first reference electrode based on the controlled transmission power, and receiving the signal transmitted from the first communication apparatus by detecting a potential difference between a second reference electrode and a second signal electrode electrostatically coupled to the communication medium of the second communication apparatus.

According to another embodiment of the present invention, there is provided a communication apparatus including, a reference electrode, a signal electrode which electrostatically couples to a communication medium, a first oscillating unit for oscillating a first AC signal having a first frequency, a second oscillating unit for oscillating a second AC signal having a second frequency, and a modulation unit for generating a modulation signal by switching and using the first AC signal or the second AC signal, and outputting the modulation signal to the reference electrode and the signal electrode.

According to another embodiment of the present invention, there is provided a communication apparatus including, a reference electrode, a signal electrode which electrostatically couples to a communication medium, a first oscillating unit for oscillating a first AC signal having a first frequency, a second oscillating unit for oscillating a second AC signal having a second frequency, and a reception processing unit for receiving a modulation signal transmitted from another communication apparatus electrostatically coupled to the communication medium by detecting a potential difference between the reference electrode and the signal electrode, and demodulating the modulation signal using the first AC signal or the second AC signal.

According to another embodiment of the present invention, there is provided a communication system including, a first communication apparatus including, a first reference electrode, a first signal electrode which electrostatically couples to a communication medium a first oscillating unit for oscillating a first AC signal having a first frequency, a second oscillating unit for oscillating a second AC signal having a second frequency, and a modulation unit for generating a modulation signal by switching and using the first AC signal or the second AC signal, and outputting the modulation signal to the first reference electrode and the first signal electrode, and a second communication apparatus including, a second reference electrode, a second signal electrode which electrostatically couples to a communication medium, a third oscillating unit for oscillating the first AC signal having the first frequency, a fourth oscillating unit for oscillating the second AC signal having the second frequency, and a reception processing unlit for receiving a modulation signal transmitted from the first communication apparatus by detecting a potential difference between the second reference electrode and the second signal electrode, and demodulating the modulation signal using the first AC signal or the second AC signal.

According to another embodiment of the present invention, there is provided a communication method including the steps of, generating a first modulation signal using a first AC signal, and transmitting the first modulation signal from a first reference electrode and a first signal electrode electrostatically coupled to a communication medium, generating a second modulation signal using a second AC signal, and transmitting the second modulation signal from the first reference electrode and the first signal electrode, receiving the first modulation signal or the second modulation signal by detecting a potential difference between a second reference electrode and a second signal electrode electrostatically coupled to the communication medium, modulation processing the first modulation signal or the second modulation signal using the first AC signal, and modulation processing the first modulation signal or the second modulation signal using the second AC signal.

According to the embodiments of the present invention described above, the communication characteristics can be stabilized irrespective of the positional relationship between the communication medium and the communication apparatus.

DETAILED DESCRIPTION OF THE PREFERRED EMBODIMENTS

Hereinafter, preferred embodiments of the present invention will be described in detail with reference to the appended drawings. Note that, in this specification and the appended drawings, structural elements that have substantially the same function and stricture are denoted with the same reference numerals and repeated explanation of these structural elements is omitted.

The "Detailed Description of the Preferred Embodiments" will be described according to the following order of items.

(1) Outline of communication system according to present embodiment (2) Communication apparatus according to first embodiment of present invention (3) Communication apparatus according to second embodiment of present invention (4) Conclusion (1) Outline of Communication System According to Present Embodiment First, a communication system 1 according to the present embodiment will be schematically described with reference to FIG. 1.

Figure 1:
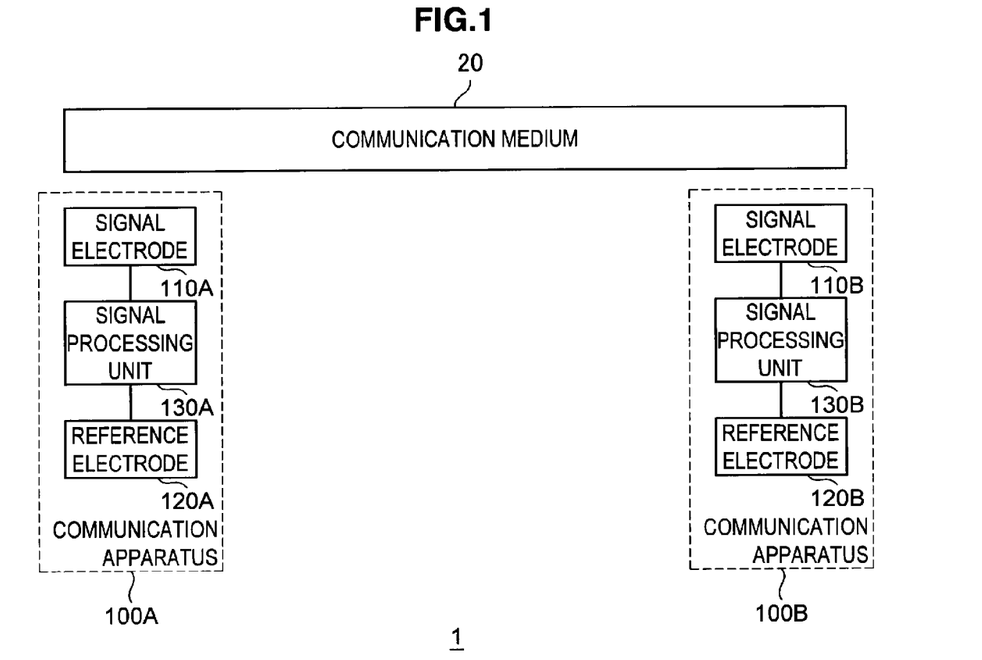
FIG. 1 is an explanatory view showing a configuration example of a communication system according to the present embodiment.

FIG. 1 is an explanatory view showing a configuration example of a communication system 1 according to the present embodiment. As shown in FIG. 1, the communication system 1 according to the present embodiment includes a plurality of communication apparatuses 100A and 100B, and a communication medium 20. The communication apparatuses 100A and 100B have a function serving as a transmission side and a function serving as a reception side, but a case where the communication apparatus 100A functions as the transmission side and the communication apparatus 100B functions as the reception side will be described below. In FIG. 1, a capital letter alphabet is given after the reference numeral such as the communication apparatuses 100A and 100B to distinguish each configuration, but the communication apparatus is simply termed as the communication apparatus 100 and the like if each configuration does not need to be particularly distinguished.

The communication apparatus 100A includes a signal electrode 110A, a reference electrode 120A, and a signal processing unit 130A. The signal electrode 110A is an electrode for forming electrostatic coupling with the communication medium 20, and the reference electrode 120A is an electrode for forming electrostatic coupling with the space. The signal processing unit 130A has a function serving as a transmission processing unit for transmitting a signal by creating a potential difference between the signal electrode 110A and the reference electrode 120A. The signal transmitted by the signal processing unit 130A includes a music signal of music, lecture, radio program, and the like; an image signal of movies television program, video program, photograph, document, picture, figure, and the like; and an arbitrary signal of game, software, and the like.

The communication medium 20 is an object having dielectric property, conductivity, or the like capable of transmitting electrical signals. In this specification, human body is given as an example of the communication medium 20, but the communication medium 20 is not limited to a human body. For instance, the communication medium 20 may be an arbitrary object including a metal which is a conductive material such as aluminum, copper, iron, and alloy, a dielectric material such as plastic, ceramic rubber, or glass, and a living body including plants and animals having the properties of both the conductive material and the dielectric material.

The communication apparatus 100B includes a signal electrode 110B, a reference electrode 120B, and a signal processing unit 130B. The signal electrode 110B is an electrode for forming electrostatic coupling with the communication medium 20, and the reference electrode 120B is an electrode for forming electrostatic coupling with the space. The signal processing unit 130B has a function serving as a reception processing unit for receiving a signal transmitted from the communication apparatus 100A by detecting the potential difference created between the signal electrode 110B and the reference electrode 120B.

The influence of the positional relationship of the communication apparatus 100A and the communication medium 20 on the communication characteristics will be described with reference to FIG. 2

Figure 2:
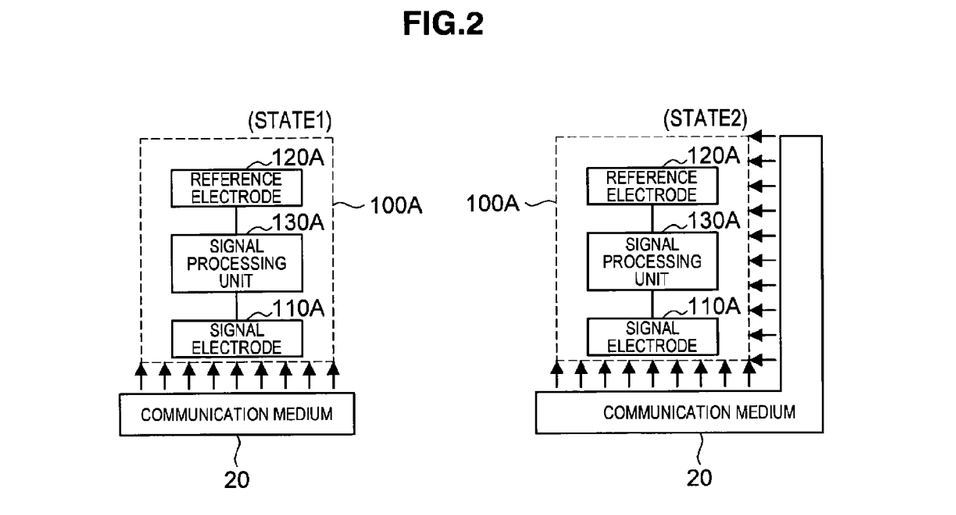
FIG. 2 is an explanatory view showing a specific example of the positional relationship of a communication apparatus and a communication medium.

FIG. 2 is an explanatory view showing a specific example of the positional relationship of the communication apparatus 100A and the communication medium 20. In state 1 shown in FIG. 2, a space exists between the signal electrode 110A and the communication medium 20, and the signal electrode 110A and the communication medium 20 are not electrically coupled, and thus electrostatic capacity forms between the signal electrode 110A and the communication medium 20. The reference electrode 120A is arranged with a distance from the signal electrode 110A, and the distance with the communication medium 20 is longer than that of the signal electrode 110A, and thus the electrostatic coupling with the communication medium 20 is sufficiently weaker than the signal electrode 110A. Therefore, if only the signal electrode 110A is strongly electrostatically coupled to the communication medium 20 as in the state 1 shown in FIG. 2, the signal transmitted from the signal electrode 110A is efficiently transmitted to the communication apparatus 100B, and thus the state 1 is considered as an ideal usage state.

In the communication apparatus 100B on the reception side as well, in a state only the signal electrode 110B is strongly electrostatically coupled to the communication medium 20, the potential difference created between the signal electrode 110B and the reference electrode 120B by the signal from the communication apparatus 100A becomes a high gain, and thus such state is considered as an ideal usage state.

When the user uses the communication apparatus 100A by holding it with his/her hand, the communication medium 20 reaches the vicinity of the reference electrode 120A, as shown in state 2 of FIG. 2, depending on the way the communication apparatus 100A is being held. In this case, not only the signal electrode 110A, but the electrostatic coupling of the reference electrode 120A and the communication medium 20 also becomes stronger. As a result, the potential difference level of the signal electrode 110A and the reference electrode 120A lowers, and the communication characteristics degrade.

In the communication apparatus 100B on the reception side as well, when the electrostatic coupling of the reference electrode 120B and the communication medium 20 becomes stronger, the potential difference created between the signal electrode 110B and the reference electrode 120B by the signal from the communication apparatus 100A becomes a low gain.

The communication apparatuses 100A and 100B according to the first embodiment of the present invention have been contrived focusing on the above situation. According to the communication apparatuses 100A and 100B of the first embodiment of the present invention, the communication characteristics can be stabilized irrespective of the positional relationship with the communication medium 20. The first embodiment of the present invention will be described in detail with reference to FIGS. 3 to 11.

(2) Communication Apparatus According to First Embodiment of Present Invention

Figure 3:
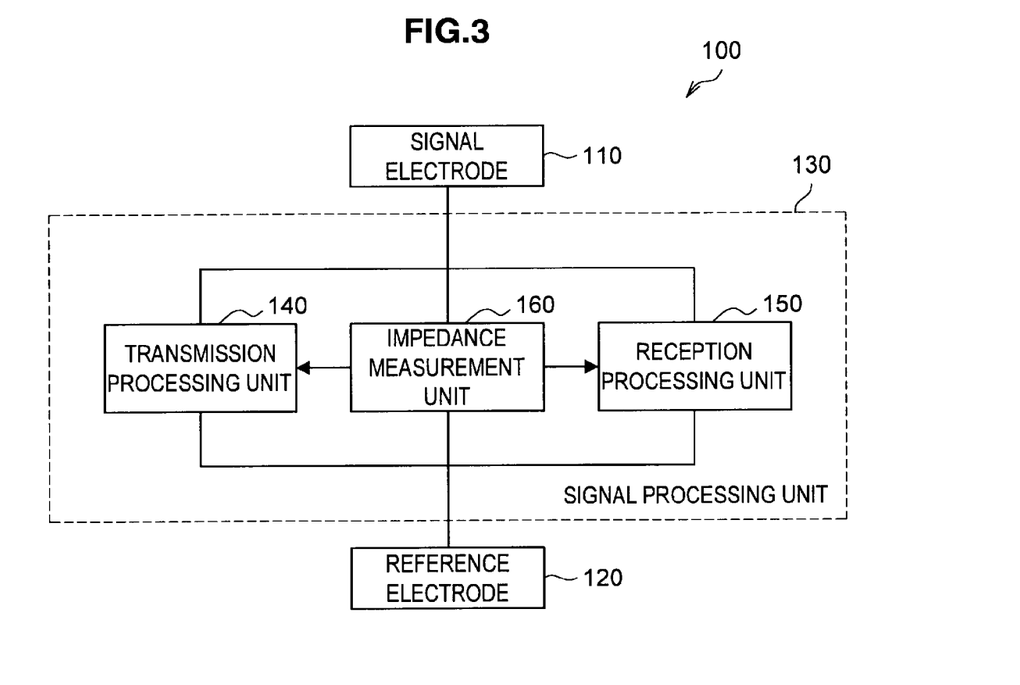
FIG. 3 is a function block diagram showing a configuration of a communication apparatus according to a first embodiment of the present invention.

FIG. 3 is a function block diagram showing a configuration of the communication apparatus 100 according to the first embodiment of the present invention. As shown in FIG. 3, the communication apparatus 100 includes a signal electrode 110, a reference electrode 120, and a signal processing unit 130 including a transmission processing unit 140, a reception processing unit 150 and an impedance measurement unit 160. The specific configuration will be described below in the order of the impedance measurement unit 160, the transmission processing unit 140, and the reception processing unit 150.

Figure 4:
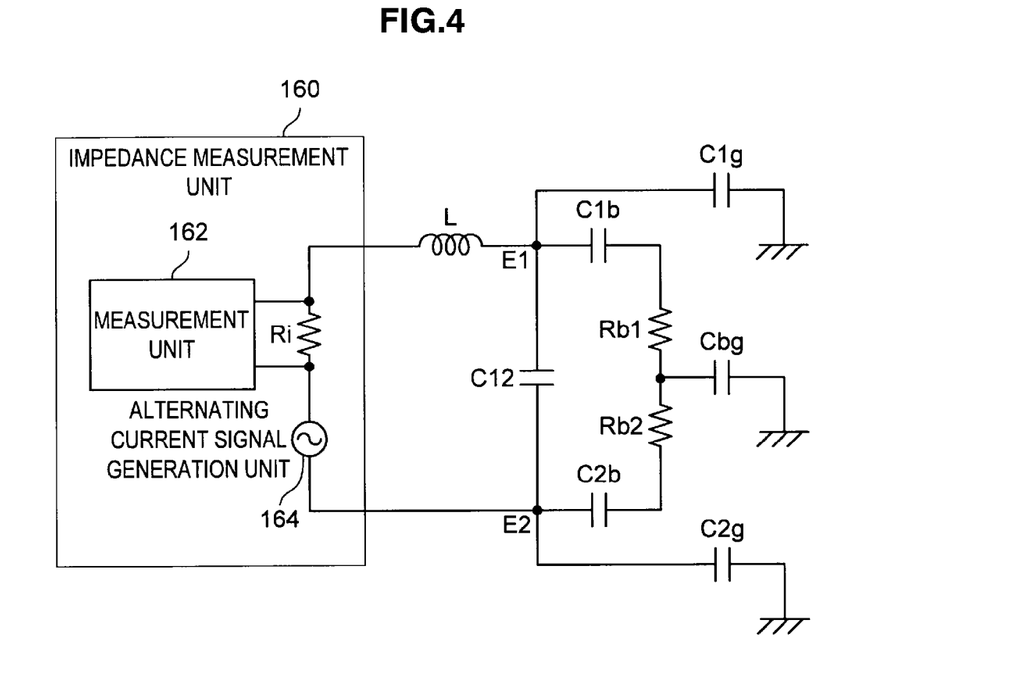
FIG. 4 is an explanatory view showing a configuration example of an impedance measurement unit.

FIG. 4 is an explanatory view showing a configuration example of the impedance measurement unit 160. As shown in FIG. 4, the impedance measurement unit 160 includes a resistor element Ri, a measurement unit 162 and an AC (Alternating Current) signal generating unit 164. FIG. 4 shows an equivalent circuit of a circuit system including between the signal electrode 110 and the reference electrode 120. E1 in FIG. 4 corresponds to the signal electrode 110 and E2 corresponds to the reference electrode 120.

In FIG. 4, an inductance L is a component parasitizing to the circuit system. A capacitance C12 is an electrostatic capacity formed between the signal electrode 110 and the reference electrode 120. A capacitance C1*b* is an electrostatic capacity formed between the signal electrode 110 and the communication medium 20. A capacitance C1g shows an electrostatic capacity with respect to space of the signal electrode 110.

A capacitance C2b is an electrostatic capacity formed between the reference electrode 120 and the communication medium 20. A capacitance C2g shows an electrostatic capacity with respect to space of the reference electrode 120.

A resistance Rb1 and a resistance Rb2 are resistance values of the communication medium 20, and occur by the conductivity of the communication medium 20. A capacitance Cbg shows an electrostatic capacity with respect to space of the communication medium 20.

The AC signal generating unit 164 (generation source) of the impedance measurement unit 160 generates a predetermined AC signal (assume frequency near carrier wave), and outputs the generated AC signal to the circuit system. The measurement unit 162 measures the signal of both ends of the resistor element Ri. The amplitude and the phase generated at the resistor element Ri by the AC signal output from the AC signal generating unit 164 depend on the impedance of the circuit system. Therefore, the measurement unit 162 can detect the impedance of the circuit system based on the amplitude and the phase of the AC signal in the resistor element Ri.

In state 2 shown in FIG. 2, the capacitance value of the C2b is assumed to be lower than in state 1, and the impedance of the circuit system including between the signal electrode 110 and the reference electrode 120 is assumed to rise (transmission degree of signal lowers). Therefore, in what state the positional relationship of the communication apparatus 100 and the communication medium 20 is in can be understood based on the impedance detected by the measurement unit 162.

FIG. 4 merely shows one example of the configuration of the impedance measurement unit 160, and the present invention is not limited to the configuration of the impedance measurement unit 160 shown in FIG. 4. For instance, the configuration of an impedance measurement unit 160' shown in FIG. 5 is also applicable.

Figure 5:
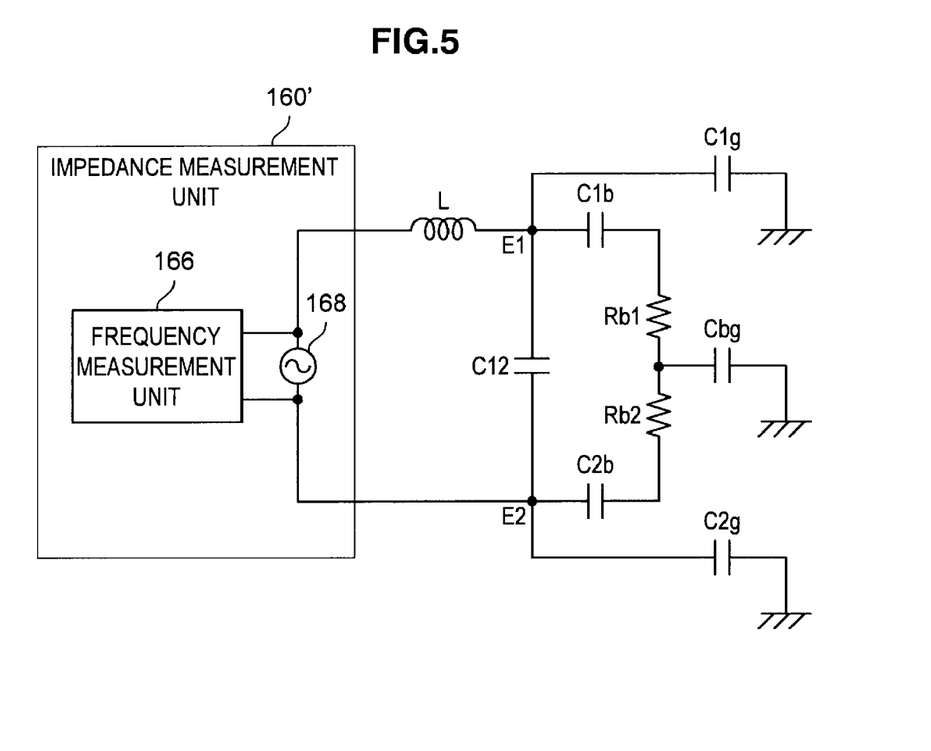
FIG. 5 is an explanatory view showing a configuration of an impedance measurement unit according to a variant.

FIG. 5 is an explanatory view showing a configuration of the impedance measurement unit 160' according to a variant. As shown in FIG. 5, the impedance measurement unit 160' according to the variant includes a frequency measurement unit 166, and an AC signal generating unit 168. Here, the AC signal generating unit 168 generates an AC signal of a frequency dependent on the impedance of the circuit system, and outputs the AC signal. In other words, in the variant, the circuit system forms a Colpitts or Hartley oscillation circuit, and the AC signal generating unit 168 generates the AC signal having an oscillating frequency of the oscillation circuit. Therefore, the frequency measurement unit 166 can detect the impedance of the circuit system by measuring the frequency of the AC signal generated by the AC signal generating unit 168.

For instance, in the state 2 shown in FIG. 27 the capacitance value of the C2b is assumed to be lower than the state 1, and the impedance of the circuit system including between the signal electrode 110 and the reference electrode 120 is assumed to rise (transmission degree of signal lowers). Therefore, in what state the positional relationship of the communication apparatus 100 and the communication medium 20 is in can be understood based on the impedance detected by the measurement unit 166.

The configuration of the transmission processing unit 140 arranged in the communication apparatus 100 according to the present embodiment will be, described below with reference to FIG. 6.

Figure 6:
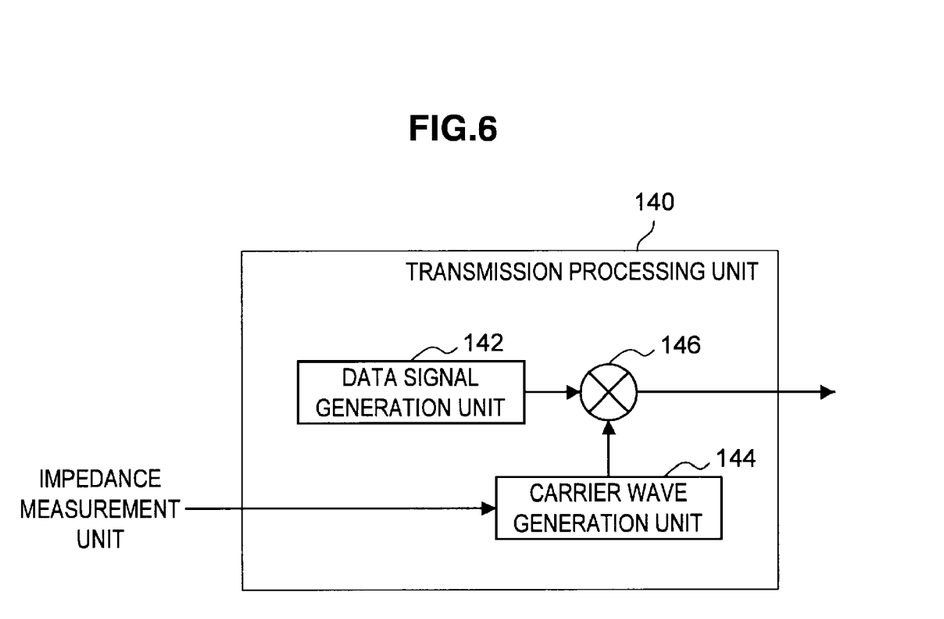
FIG. 6 is a function block diagram showing a configuration of a transmission processing unit.

FIG. 6 is a function block diagram showing a configuration of the transmission processing unit 140. As shown in FIG. 6, the transmission processing unit 140 includes a data signal generating unit 142, a carrier wave generating unit 144, and multiplier 146.

The data signal generating unit 142 reads out data stored in an arbitrary memory, processes the data as necessary, and outputs the data as a data signal. In addition, the data signal generating unit 142 may output communication control data (e.g., ACK), or transmission request data of arbitrary data, instruction data to the communication apparatus 100B, and the like to the communication apparatus 100B.

The arbitrary memory includes recording media including a non-volatile memory such as EEPROM (Electrically Erasable Programmable Read-Only Memory), EPROM (Erasable Programmable Read Only Memory); a magnetic disc such as hard disc and disc-shaped magnetic disc; an optical disc such as CD-R (Compact Disc Recordable)/RW (ReWritable), DVD-R (Digital Versatile Disc Recordable)/RW/+R/+RW/ RAM (Random Access Memory) and BD (Blu-Ray Disc (registered trademark))-R/BD-RE; and an MO (Magneto Optical) disc.

The carrier wave generating unit 144 generates the carrier wave of the data signal generated by the data signal generating unit 142. More specifically, the carrier wave generating unit 144 generates the carrier wave having the transmission power (amplitude) corresponding to the measurement result of the impedance by the impedance measurement unit 160. The multiplier 146 modulates the data signal generated by the data signal generating unit 142 by multiplying the carrier wave generated by the carrier wave generating unit 144 thereto, and outputs the modulation signal to the signal electrode 110 and the reference electrode 120.

For instance, the carrier wave generating unit 144 may generate the carrier wave having a large transmission power as the transmission degree of the signal is assumed to be low, the larger the impedance measured by the impedance measurement unit 160. According to such configuration, the communication characteristics can be maintained even if the positional relationship of the communication apparatus 100 and the communication medium 20 corresponds to state 2 shown in FIG. 2.

The carrier wave generating unit 144 may generate the carrier wave having a first transmission power when the impedance measured by the impedance measurement unit 160 is smaller than a predetermined value, and generate the carrier wave having a second transmission power greater than the first transmission power when the impedance is greater than the predetermined value. According to such configuration, the communication can be stabilized irrespective of the positional relationship of the communication apparatus 100 and the communication medium 20 by transmitting the signal at the first transmission power in state 1 shown in FIG. 2 and at the second transmission power in state 2.

An example of adjusting the transmission power by causing the carrier wave generating unit 144 to generate the carrier wave according to the impedance measured by the impedance measurement unit 160 has been described, but the present invention is not limited to such example. For instance, the transmission power may be adjusted by controlling the gain of the modulation signal output from the multiplier 146 according to the impedance measured by the impedance measurement unit 160.

In the above description, an example in which the transmission processing unit 140 modulates the data signal with the AM (Amplitude Modulation) modulation method has been described, but the present invention is not limited thereto. The transmission processing unit 140 may modulate the data signal with an arbitrary modulation method such as FM modulation (Frequency Modulation). PM modulation (Phase Modulation), and QAM modulation (Quadrature Amplitude Modulation).

The configuration of the reception processing unit 150 arranged in the communication apparatus 100 according to the present embodiment will be described below with reference to FIG. 7.

Figure 7:
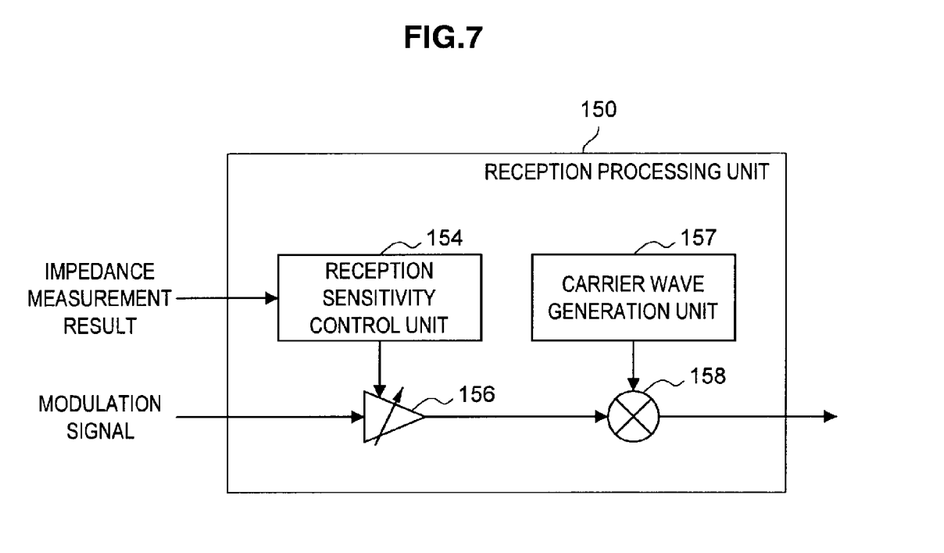
FIG. 7 is a function block diagram showing the configuration of a reception processing unit.

FIG. 7 is a function block diagram showing the configuration of the reception processing unit 150. As shown in FIG. 7, the reception processing unit 150 includes a reception sensitivity control unit 154, an AMP 156, a carrier wave generating unit 157, and a multiplier 158.

The potential difference between the signal electrode 110 and the reference electrode 120 is input to the reception processing unit 150 as a modulation signal. The AMP 156 amplifies the modulation signal at the dynamic gain based on the control by the reception sensitivity control unit 154. Thereafter, the multiplier 158 demodulates the modulation signal by multiplying the carrier wave generated by the carrier wave generating unit 157 and the modulation signal, and outputs the demodulation signal.

The reception sensitivity control unit 154 causes the AMP 156 to amplify the modulation signal at the amplification factor (reception sensitivity) corresponding to the measurement result of the impedance by the impedance measurement unit 160. For instance, the reception sensitivity control unit 154 may enhance the amplification factor of the modulation signal in the AMP 156 as the transmission degree of the signal is assumed to be lower, the larger the impedance measured by the impedance measurement unit 160. According to such configuration, the communication characteristics can be maintained even if the positional relationship of the communication apparatus 100 and the communication medium 20 corresponds to the state 2 shown in FIG. 2.

The reception sensitivity control unit 154 may cause the AMP 156 to amplify the modulation signal at a first amplification factor when the impedance measured by the impedance measurement unit 160 is smaller than a predetermined value, and to amplify the modulation signal at a second amplification factor when the impedance is greater than the predetermined value. According to such configuration, the communication can be stabilized irrespective of the positional relationship of the communication apparatus 100 and the communication medium 20 by amplifying the modulation signal at the first amplification factor in state 1 shown in FIG. 2 and at the second amplification factor in state 2.

Subsequently, an example of the timing to execute the transmission process, reception process, and measurement of the impedance will be described with reference to FIG. 8.

Figure 8:
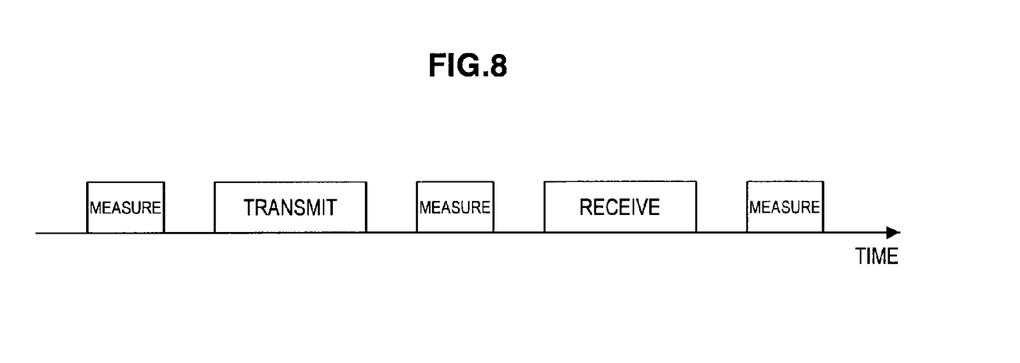
FIG. 8 is an explanatory view showing an example of the timing to execute the transmission process the reception process, and the measurement of the impedance.

FIG. 8 is an explanatory view showing an example of the timing to execute the transmission process the reception process, and the measurement of the impedance. As shown in FIG. 8, the impedance measurement unit 160 can perform the measurement of the impedance in the vacant time of the transmission process and the reception process, and the transmission processing unit 140 and the reception processing unit 150 can perform the signal processing based on the measurement result of the impedance.

An example of performing the measurement of the impedance simultaneously with the transmission process will be described with reference to FIGS. 9 and 10.

Figure 9:
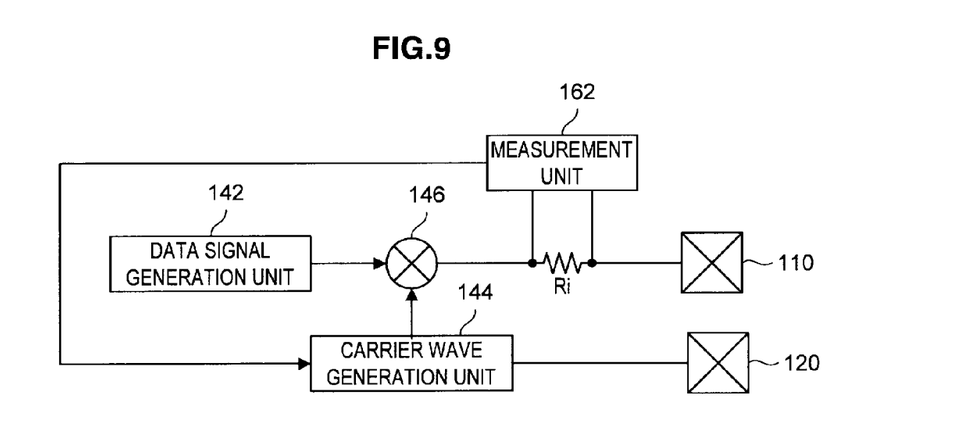
FIG. 9 is an explanatory view showing a variant of the impedance measurement unit and the transmission processing unit.

FIG. 9 is an explanatory view showing a variant of the impedance measurement unit 160 and the transmission processing unit 140. In this variant, the measurement unit 162 measures the amplitude and the phase in the resistor element Ri of the modulation signal output from the multiplier 146 to measure the impedance of the circuit system including the signal electrode 110 and the reference electrode 120. The carrier wave generating unit 144 generates the carrier wave having the transmission power corresponding to the impedance measured by the impedance measurement unit 160, and outputs the carrier wave to the multiplier 146. The timing of executing the transmission process, the reception process, and the measurement of the impedance in the variant is shown in FIG. 10.

Figure 10:
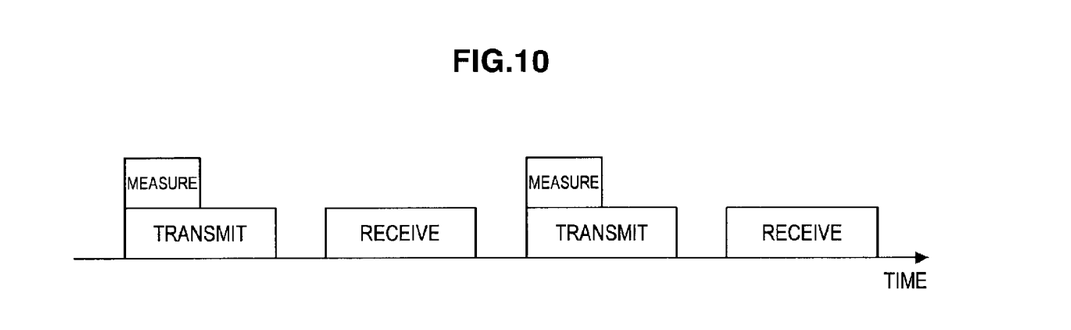
FIG. 10 is an explanatory view showing another example of the timing to execute the transmission process, the reception process, and the measurement of the impedance.

FIG. 10 is an explanatory view showing another example of the timing to execute the transmission process, the reception process, and the measurement of the impedance. As shown in FIG. 10, according to the variant, the impedance can be measured at the same time as the transmission process, and thus the throughput can be expected to enhance. Furthermore the circuit scale and the cost can be saved since an independent AC signal generating function may not be provided to measure the impedance. Moreover, the reception processing unit 150 performs the demodulation process using the carrier wave generated in the transmission processing unit 140, whereby the circuit scale and the cost can be further reduced.

Figure 11:
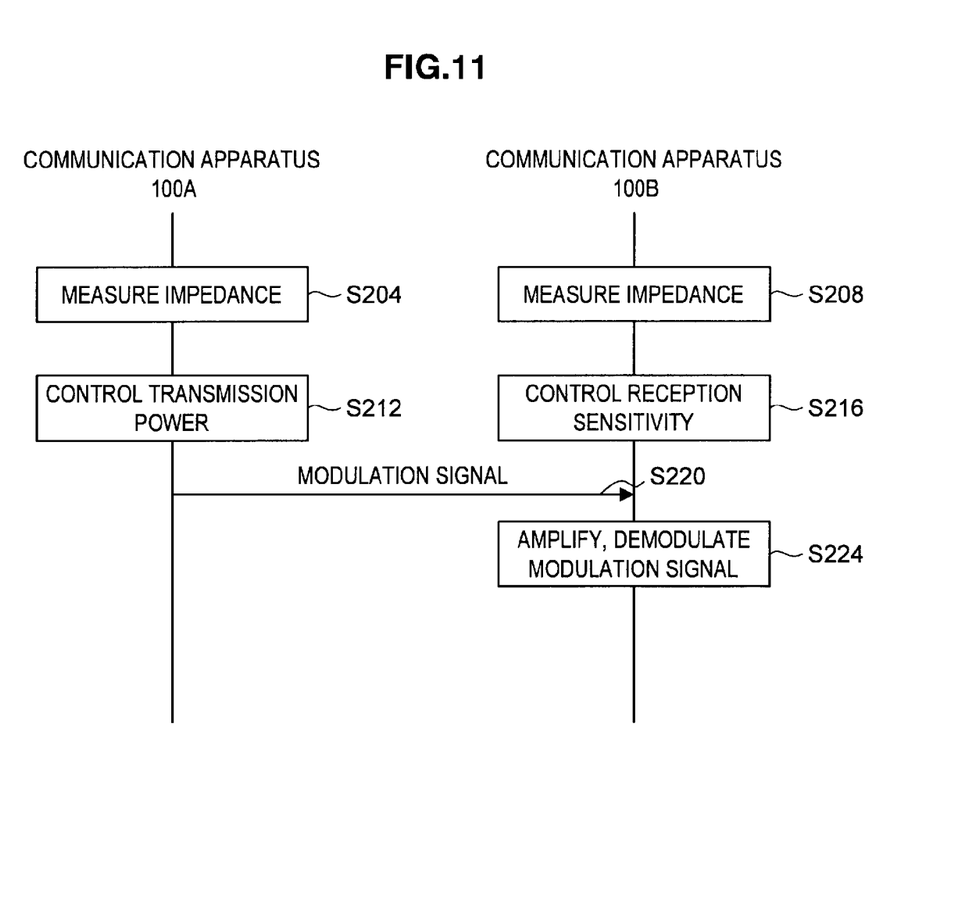
FIG. 11 is a sequence chart showing a flow of the communication method executed in the communication apparatuses according to the first embodiment.

The communication method executed in the communication apparatuses 100A and 110B according to the first embodiment of the present invention described above will be briefly summarized with reference to FIG. 11. FIG. 11 is a sequence chart showing a flow of the communication method executed in the communication apparatuses 100A and 100B according to the first embodiment. As shown in FIG. 11, the impedance measurement unit 160A of the communication apparatus 100A first measures the impedance of the circuit system including between the signal electrode 110A and the reference electrode 120A (S204). Similarly, the impedance measurement unit 160B of the communication apparatus 100B measures the impedance of the circuit system including between the signal electrode 110B and the reference electrode 120B (S208).

Thereafter, the transmission control unit 140A of the communication apparatus 100A controls the transmission power based on the impedance measured by the impedance measurement unit 160A (S212). Similarly, the reception control unit 150B of the communication apparatus 100B controls the reception sensitivity based on the impedance measured by the impedance measurement unit 160B (S216).

Subsequently, the transmission processing unit 140A, of the communication apparatus 100A transmits the modulation signal at the transmission power controlled in S212 (S220), and the reception processing unit 150 of the communication apparatus 100B amplifies the modulation signal at the reception sensitivity controlled in S216 and demodulates the signal (S224).

(3) Communication Apparatus According to Second Embodiment of Present Invention

The communication apparatus 100 according to the first embodiment of the present invention has been described with reference to FIGS. 3 to 11. The communication apparatus 100 according to the second embodiment of the present invention will now be described with reference to FIGS. 12 to 15.

Figure 12:
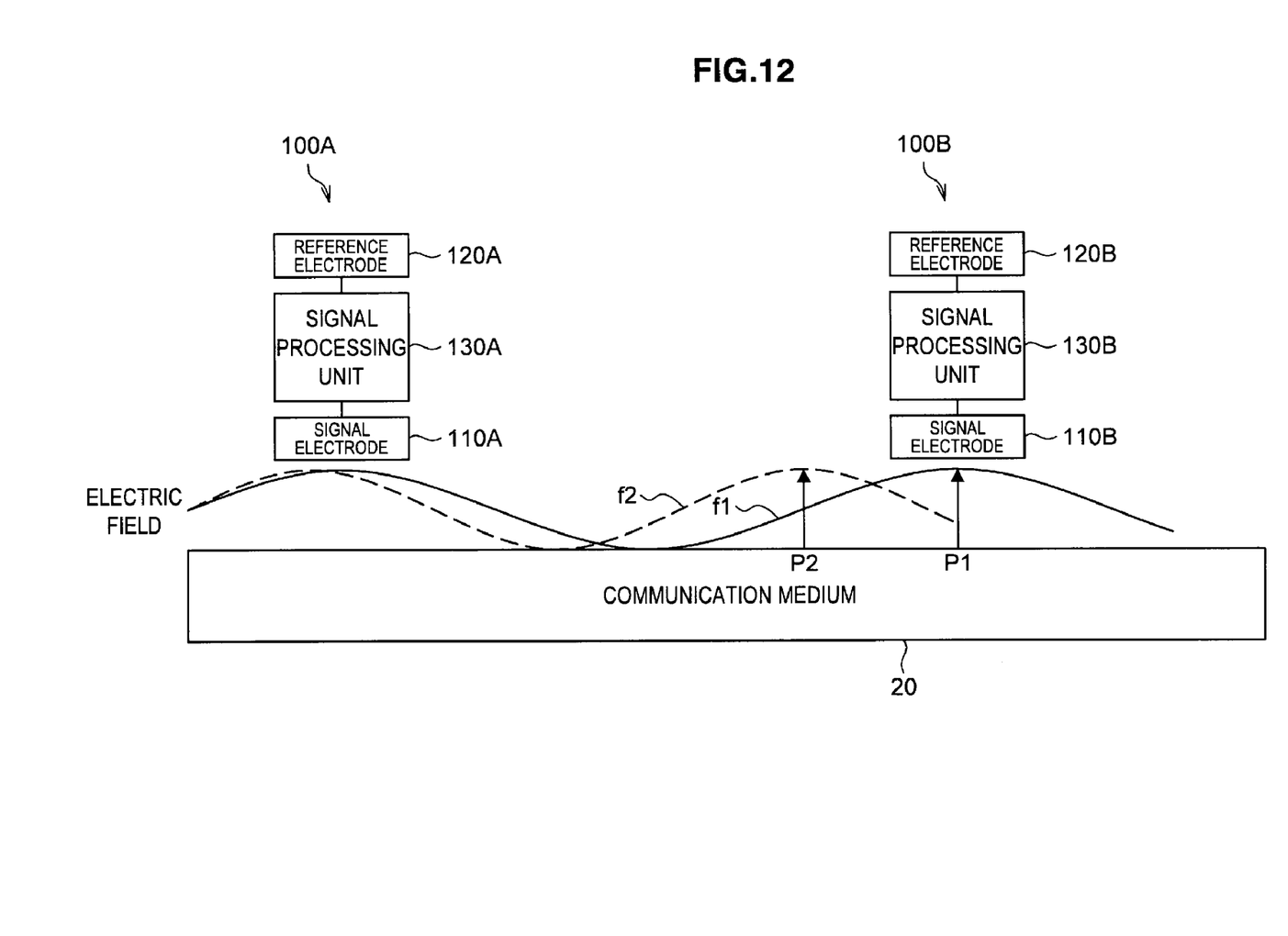
FIG. 12 is an explanatory view showing a relationship of the position of the communication medium and the electric field intensity.

FIG. 12 is an explanatory view showing a relationship of the position of the communication medium 20 and the electric field intensity. In FIG. 12, f1 shows the distribution of the electric field intensity of when the signal is transmitted by the electric field at frequency f1 from the signal electrode 110A, and f2 shows the distribution of the electric field intensity of when the signal is transmitted by the electric field at frequency f2 from the signal electrode 110A. Thus, the distribution of the electric field intensity at the surface layer of the communication medium 20 is assumed to be in a standing wave state as the communication medium 20 has a specific physical size.

As a result, the communication apparatus 100B existing at position P1 can receive the signal at sufficient intensity when the communication apparatus 100A transmits the signal at the frequency f1, but the reception intensity of the signal becomes weak when the communication apparatus 100A transmits the signal at the frequency f2. If the positional relationship of the communication apparatus 100A and the communication apparatus 100B is known, the signal can be transmitted using the frequency corresponding to the positional relationship, but the positional relationship of the communication apparatus 100A and the communication apparatus 100B often changes fluidly.

The second embodiment of the present invention is contrived focusing on the above situation. According to the second embodiment of the present invention, the communication quality can be guaranteed irrespective of the position of the pair of communication apparatuses. The second embodiment will be specifically described below.

Figure 13:
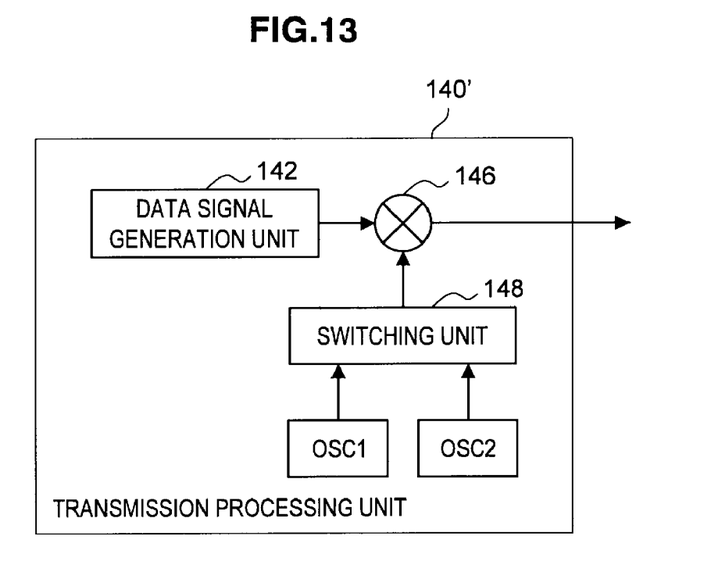
FIG. 13 is an explanatory view showing a configuration example of a transmission processing unit according to a second embodiment.

FIG. 13 is an explanatory view showing a configuration example of a transmission processing unit 140' according to the second embodiment. As shown in FIG. 13, the transmission processing unit 140' according to the second embodiment includes an oscillator OSC1 for oscillating the frequency f1, an oscillator OSC2 for oscillating the frequency f2, and a switching unit 148 in addition to the data signal generating unit 142 and the multiplier 146.

The switching unit 148 outputs the carrier wave of the frequency f1 generated by the oscillator OSC1 (first oscillating unit) and the carrier wave of the frequency f2 generated by the oscillator OSC2 (second oscillating unit) alternately to the multiplier 146 in units of one frame of the transmission data according to the communication method. The multiplier 146 modulates the data signal (baseband signal) generated by the data signal generating unit 142 by multiplying the carrier wave of the alternately switched frequency f1 or frequency f2 thereto, and the modulation signal is transmitted from the signal electrode 110A and the reference electrode 120A.

Figure 14:
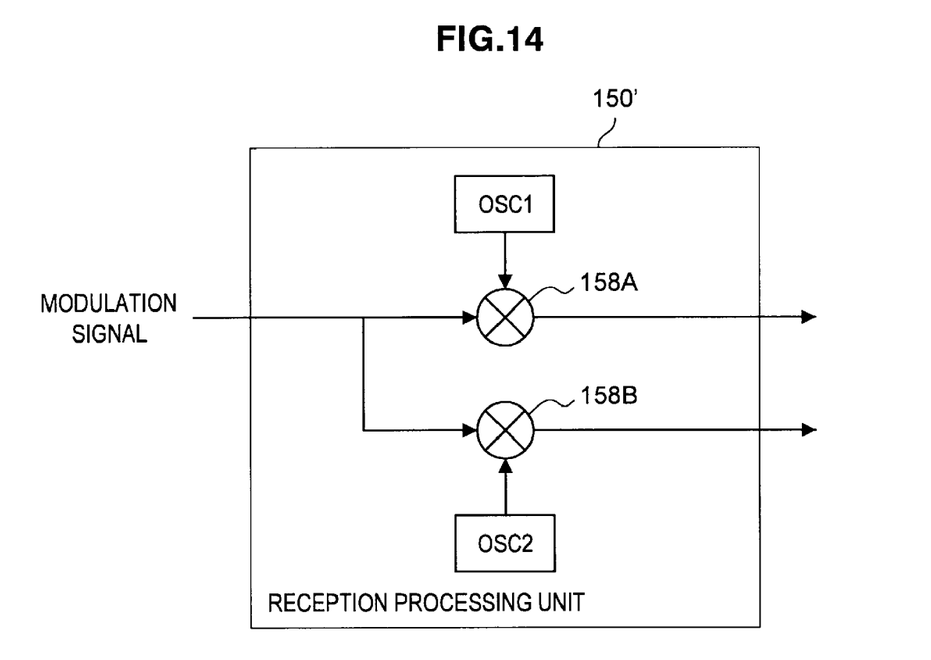
FIG. 14 is an explanatory view showing a configuration example of a reception processing unit according to the second embodiment.

FIG. 14 is an explanatory view showing a configuration example of a reception processing unit 150' according to the second embodiment. As shown in FIG. 14, the reception processing unit 150' according to the second embodiment includes a multiplier 158A, a multiplier 158B, an oscillator OSC1 for oscillating the frequency f1, and an oscillator OSC2 for oscillating the frequency f2.

The multiplier 158A multiples the carrier wave of the frequency f1 generated by the oscillator OSC1 (third oscillating unit), and the modulation signal detected as the potential difference of the signal electrode 110A and the reference electrode 120A. Similarly, the multiplier 158B multiples the carrier wave of the frequency f2 generated by the oscillator OSC2 (fourth oscillating unit), and the modulation signal detected as the potential difference of the signal electrode 110A and the reference electrode 120A. Therefore, the reception processing unit 150' according to the second embodiment can enhance the reception probability of at least one of the modulation signals transmitted by the carrier wave of the frequency f1 or the frequency f2, as shown in FIG. 15.

Figure 15:
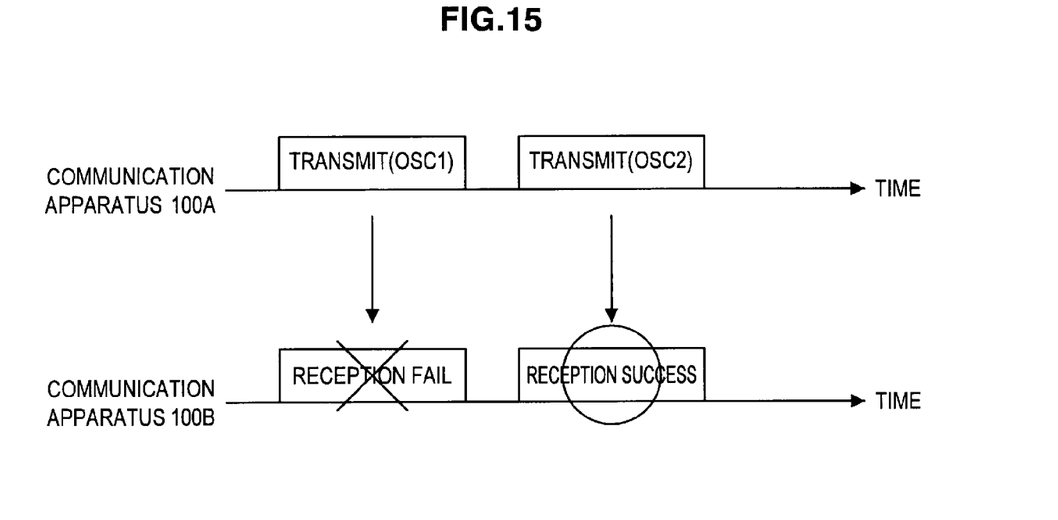
FIG. 15 is an explanatory view showing a communication example according to the second embodiment of the present invention.

FIG. 15 is an explanatory view showing a communication example according to the second embodiment of the present invention. In the example shown in FIG. 15, an example where the communication apparatus 100B fails in receiving the modulation signal transmitted from the communication apparatus 100A at the carrier wave of the frequency f1 due to the influence of the standing wave, but succeeds in receiving the modulation signal transmitted at the carrier wave of the frequency f2 is shown.

According to the present embodiment, even if the positional relationship of the pair of communication apparatuses is unknown, the reliability of the communication can be enhanced by multiply transmitting the signal at different carrier waves.

The communication apparatus 100B that succeeded in the reception of the signal transmitted by one carrier wave may return the ACK containing the information indicating the carrier wave to the communication apparatus 100A. The communication apparatus 100A may transmit the signal using the carrier wave indicated by the information contained in the ACK over a predetermined period. According to such configuration, the communication apparatus 100A suppresses a case of transmitting the signal using the carrier wave that may not be received by the communication apparatus 100B, thereby enhancing the throughput.

If the reception of the signal from the communication apparatus 100A is interrupted, the communication apparatus 100B may notify such fact to the communication apparatus 100A. The communication apparatus 100A then switches the carrier wave to use, and transmits the signal using the carrier wave having a high possibility of reaching the communication apparatus 100B.

If at which timing the signal using one of the carrier waves is transmitted can be grasped in advance, the communication apparatus 100A may not necessarily include a plurality of multipliers 158A and 158B as shown in FIG. 14. In this case, the effects similar to above can be expected by switching the carrier wave input to one multiplier based on the timing gasped in advance.

(4) Conclusion

As described above, the communication apparatus 100 according to the first embodiment of the present invention controls the transmission power or the reception sensitivity according to the impedance between the signal electrode 110 and the reference electrode 120. As a result, a stable communication can be maintained irrespective of the strength of the electrostatic coupling of the reference electrode 120 and the communication medium 20.

The communication apparatus 100 according to the second embodiment of the present invention transmits or receives the signal by multiply using the carrier waves having different frequencies. Therefore, the reception probability of the signal transmitted using one of the carrier waves can be enhanced even if the signal transmitted to the communication medium 20 is in the standing wave state.

It should be understood by those skilled in the art that various modifications, combinations, sub-combinations and alterations may occur depending on design requirements and other factors insofar as they are within the scope of the appended claims or the equivalents thereof.

For instance, each step in the process of the communication apparatuses 100A and 100B of the present specification may not necessarily be processed in time-series along the order described as a sequence chart. Each step in the process of the communication apparatuses 100A and 100B may include the process executed in parallel or individually (e.g., parallel process or process by object).

The present application contains subject matter related to that disclosed in Japanese Priority Patent Application JP 2008-150910 filed in the Japan Patent Office on Jun. 9, 2008, the entire content of which is hereby incorporated by reference.

What is claimed is:

1. A communication apparatus comprising:
a reference electrode;
a signal electrode which electrostatically couples to a communication medium;
a measurement unit for measuring an impedance of a circuit system including between the reference electrode and the signal electrode; and
a transmission processing unit for creating a potential difference between the signal electrode and the reference electrode based on a transmission power corresponding to the impedance of the circuit system measured by the measurement unit, and transmitting a signal to another communication apparatus electrostatically coupled to the communication medium.

2. The communication apparatus according to claim 1, wherein
the measurement unit includes a generation source of an AC signal to be output to the circuit system for measurement of the impedance; and
the transmission processing unit transmits the signal using the AC signal output by the generation source as a carrier wave.

3. The communication apparatus according to claim 2, wherein the measurement unit measures the impedance of the circuit system simultaneously with the transmission of the signal by the transmission processing unit using the AC signal.

4. The communication apparatus according to claims 1, 2 or 3, wherein the transmission processing unit transmits the signal based on a high transmission power, the higher the impedance of the circuit system.

5. A communication apparatus comprising:
a reference electrode;
a signal electrode which electrostatically couples to a communication medium;
a measurement unit for measuring an impedance of a circuit system including between the reference electrode and the signal electrode; and
a reception processing unit for receiving a signal transmitted from another communication apparatus electrostatically coupled to the communication medium by detecting a potential difference between the signal electrode and the reference electrode at a reception sensitivity corresponding to the impedance of the circuit system measured by the measurement unit,
wherein the reception processing unit receives the signal at a high reception sensitivity, the higher the impedance of the circuit system.

6. The communication apparatus according to claim 5, wherein
the measurement unit includes a generation source of an AC signal to be output to the circuit system for measurement of the impedance; and
the reception processing unit demodulates the signal transmitted from another communication apparatus using the AC signal output by the generation source.

7. A communication system comprising:
a first communication apparatus including,
a first reference electrode,
a first signal electrode which electrostatically couples to a communication medium,
a measurement unit for measuring an impedance of a circuit system including between the first reference electrode and the first signal electrode, and
a transmission processing unit for creating a potential difference between the first signal electrode and the first reference electrode based on a transmission power corresponding to the impedance of the circuit system measured by the measurement unit, and transmitting a signal to another communication apparatus electrostatically coupled to the communication medium; and
a second communication apparatus including,
a second reference electrode,
a second signal electrode which electrostatically couples to a communication medium, and
a reception processing unit for receiving a unit for receiving a signal transmitted from the first communication apparatus by detecting a potential difference between the second signal electrode and the second reference electrode.

8. A communication method comprising the steps of:
measuring an impedance of a circuit system including between a first reference electrode and a first signal electrode electrostatically coupled to a communication medium of a first communication apparatus;
controlling a transmission power of a signal according to the measured impedance of the circuit system;
transmitting the signal; by creating a potential difference between the first signal electrode and the first reference electrode based on the controlled transmission power; and
receiving the signal transmitted from the first communication apparatus by detecting a potential difference between a second reference electrode and a second signal electrode electrostatically coupled to the communication medium of the second communication apparatus.

9. A communication apparatus comprising:
a reference electrode;
a signal electrode which electrostatically couples to a communication medium;
a first oscillating unit for oscillating a first AC signal having a first frequency;
a second oscillating unit for oscillating a second AC signal having a second frequency; and
a modulation unit for generating a modulation signal by switching and using the first AC signal or the second AC signal, and outputting the modulation signal to the reference electrode and the signal electrode.

10. A communication apparatus comprising:
a reference electrode;
a signal electrode which electrostatically couples to a communication medium;
a first oscillating unit for oscillating a first AC signal having a first frequency;
a second oscillating unit for oscillating a second AC signal having a second frequency; and
a reception processing unit for receiving a modulation signal transmitted from another communication apparatus electrostatically coupled to the communication medium by detecting a potential difference between the reference electrode and the signal electrode, and demodulating the modulation signal using the first AC signal or the second AC signal.

11. A communication system comprising:
a first communication apparatus including,
a first reference electrode,
a first signal electrode which electrostatically couples to a communication medium,
a first oscillating unit for oscillating a first AC signal having a first frequency,
a second oscillating unit for oscillating a second AC signal having a second frequency, and a modulation unit for generating a modulation signal by switching and using the first AC signal or the second AC signal, and outputting the modulation signal to the first reference electrode and the first signal electrode; and a second communication apparatus including,
a second reference electrode,
a second signal electrode which electrostatically couples to a communication medium,
a third oscillating unit for oscillating the first AC signal having the first frequency,
a fourth oscillating unit for oscillating the second AC signal having the second frequency, and
a reception processing unit for receiving a modulation signal transmitted from the first communication apparatus by detecting a potential difference between the second reference electrode and the second signal electrode, and demodulating the modulation signal using the first AC signal or the second AC signal.

12. A communication method comprising the steps of:
generating a first modulation signal using a first AC signal, and transmitting the first modulation signal from a first reference electrode and a first signal electrode electrostatically coupled to a communication medium;
generating a second modulation signal using a second AC signal, and transmitting the second modulation signal from the first reference electrode and the first signal electrode;
receiving the first modulation signal or the second modulation signal by detecting a potential difference between a second reference electrode and a second signal electrode electrostatically coupled to the communication medium;
modulation processing the first modulation signal or the second modulation signal using the first AC signal; and
modulation processing the first modulation signal or the second modulation signal using the second AC signal.

* * * * *